(12) United States Patent
Wang et al.

(10) Patent No.: US 6,359,928 B1
(45) Date of Patent: Mar. 19, 2002

(54) SYSTEM AND METHOD FOR COMPRESSING IMAGES USING MULTI-THRESHOLD WAVELET CODING

(75) Inventors: Houng-Jyh Mike Wang; Yiliang Bao, both of Los Angeles; Chung-Chieh Kuo, Arcadia; Homer H. Chen, Thousand Oaks, all of CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 09/162,091

(22) Filed: Sep. 28, 1998

Related U.S. Application Data

(60) Provisional application No. 60/060,271, filed on Sep. 29, 1997.

(51) Int. Cl.[7] .................................................. H04N 7/30
(52) U.S. Cl. .............................. 375/240.05; 375/240.11; 375/240.19
(58) Field of Search ........................ 375/240.11, 240.03, 375/240.04, 240.05, 240.19; 348/398; H04N 7/30

(56) References Cited

U.S. PATENT DOCUMENTS

| | | | |
|---|---|---|---|
| 5,101,446 A | 3/1992 | Resnikoff et al. | 382/248 |
| 5,128,757 A | 7/1992 | Citta et al. | 375/240.11 |
| 5,429,636 A | 7/1995 | Shikhman et al. | 606/41 |
| 5,552,832 A | 9/1996 | Astle | 375/240.24 |
| 5,555,511 A | 9/1996 | Ooi | 358/1.15 |
| 5,657,085 A * | 8/1997 | Katto | 375/240.19 |
| 5,798,794 A * | 8/1998 | Takahashi | 375/240.19 |
| 5,953,460 A * | 9/1999 | Wu | 375/240.19 |
| 6,160,846 A * | 12/2000 | Chiang et al. | 375/240.05 |

FOREIGN PATENT DOCUMENTS

| | | |
|---|---|---|
| EP | 490539 A2 | 6/1992 |
| EP | 490539 A3 | 6/1992 |
| WO | WO 97/35427 | 9/1997 |

OTHER PUBLICATIONS

Jerome M. Shapiro, An Embedded Hierarchical Image Coder Using Zerotrees of Wavelet Coefficients,Data Compression Conference, Mar. 30, 1993, pp. 214–223.

High Fidelity Image Compression With Multithreshold Wavelet Coding (MTWC) Appl. Digital Image Proc. XX, San Diego, CA, USA, Jul. 30–Aug. 1, 1997, vol. 3164, pp. 383–392, SPIE–Int. Soc. Opt. Eng, USA.

Jin Li et al., "A Wavelet Transform Approach to Video Compression", Apr. 17–21, 1995 Wavelet Applications, Orlando, Florida.

Jerome M. Shapiro et al., "Embedded Image Coding Using Zerotrees of Wavelet Coefficients", IEEE Transactions on Signal Processing Vo. 41, No. 12, Dec. 1993, pp. 3445–3462.

(List continued on next page.)

Primary Examiner—Howard Britton
(74) Attorney, Agent, or Firm—Christopher J. Rourk; Akin, Gump, Strauss, Hauer & Feld, LLP

(57) ABSTRACT

A system and method for performing image compression using multi-threshold wavelet coding (MTWC) which utilizes a separate initial quantization threshold for each subband generated by the wavelet transform, which substantially reduces the number of insignificant bits generated during the initial quantization steps. Further, the MTWC system chooses the order in which the subbands are encoded according to a preferred rate-distortion tradeoff in order to enhance the image fidelity. Moreover, the MTWC system utilizes a novel quantization sequence order in order to optimize the amount of error energy reduction in significant and refinement maps generated during the quantization step. Thus, the MTWC system provides a better bit rate-distortion tradeoff and performs faster than existing state-of-the-art wavelet coders.

14 Claims, 7 Drawing Sheets

OTHER PUBLICATIONS

Zixiang Xiong et al., "A DCT–Based Embdded Image Coder", IEEE Signal Processing Letters, Nov. 1996, pp. 1–6.

Jiankun Li et al., "An Embedded DCT Approach to Progressive Image Compression", ICIP '96, IEEE International Conference on Image Processing, vol. 1, pp. 201–204.

David Taubman et al., "Multitrate 3–D Subband Coding of Video", IEEE Transations on on Image Processing, vol. 3, No. 5, Sep. 1994, pp. 572–588.

Jin Li et al., "On the Improvements of Embedded Zerotree Wavelet (EZW) Coding", Visual Communications and Image Procesing '95, Taipei, Taiwan, May 1995, pp. 1490–1501.

Amir Said et al., "A New Fast and Efficient Image Codec Based on Set Partitioning in Hierachical Trees", IEEE Transactions on Circuits and Systems for Video Technology, vol. 6, Jun. 1996, PP 1–16.

Jin Li et al., "Image Compression Using Fast Rate–Distortion Optiimized Wavelet Packet Transform", IEEE Transactions on Circuits and Systems for Video Technology, Jul. 1996.

Jin Li et al., "Rate–Distortion Optimized Wavelet Packet Transform for Image Compression", IEEE Transactions on Circuits and Systems for Video Technology, Jul. 1996.

\* cited by examiner

SYSTEM AND METHOD FOR COMPRESSING IMAGES USING MULTI-THRESHOLD WAVELET CODING

CROSS-REFERENCE TO RELATED APPLICATIONS

This application is a continuation of provisional application Ser. No. 60/060,271 filed Sept. 29, 1997 for a Method for Compressing Color Images Using Wavelet Coding.

BACKGROUND OF THE INVENTION

1. Field of the Invention

The present invention relates generally to a system and method for compressing images, and specifically to a system and method for performing image compression using multi-threshold wavelet coding.

2. Description of Related Art

The compression of images for transmission or storage has become widely practiced in a variety of contexts in order to reduce the rather large size of most image files. Progressive fully-embedded image compression has become particularly important when images are being compressed for real-time transmission, especially in multimedia environments for video conferencing, video games, Internet image transmissions, digital TV and the like. There are two types of compression methods, lossless and lossy techniques. A lossless technique allows exact reconstruction of all of the individual pixel values, while a lossy technique does not allow for an exact reconstruction of the image. Much higher compression ratios can be achieved by lossy techniques if some loss of the exact pixel values can be tolerated.

Image compression is accomplished using an image coder, wherein a typical transform image coder consists of three parts: a transform 10, a quantizer 12, and an encoder 14, as illustrated in FIG. 1. The transform 10 decorrelates the original image from the spatial domain into a transform domain where the image can be more compactly represented. The quantizer 12 restricts the representation of the signal into discrete intervals, in which sampled image pixel data values, like color and luminance, are represented by, or are mapped onto, a fixed number of predefined quantizer values. The quantized signal is composed of quantizer values that are, in fact, approximations of the sampled image pixel values. Therefore, the encoding of the image data onto a limited number of quantizer values necessarily produces some loss in accuracy and distortion of the signal after the decoding process. Finally, the image coder encodes the quantized coefficients using the encoder 14. One of the most widely used transform image coding schemes is the Joint Photographers Expert Group (JPEG) standard formed in collaborative effort of the CCITT (International Telegraph and Telephone Consultative Committee) and the ISO (International Standards Organization).

JPEG utilizes a block discrete cosine transform (DCT) as its transform component. Block DCT and other similar transforms decompose images into a representation in which each coefficient corresponds to a fixed size spatial area and a fixed frequency bandwidth, where the bandwidth and spatial area are effectively the same for all coefficients in the representation. Edge or object boundary information in an image tends to disperse so that many non-zero coefficients are required to represent edges with good precision. Since the edges represent relatively insignificant energy with respect to the entire image, transform coders using block DCT are fairly successful at high bit rates. However, at low bit rates, transform coders using block DCT, such as JPEG, tend to allocate too many bits to areas of high statistical spatial correlation and have few bits left over to represent the edges. As a result, blocking artifacts often result with transform coders using block DCT, which significantly degrades the resolution of the reconstructed image. It is well known that, due to the use of block DCT, JPEG tends to introduce severe blocking artifacts at low bit rates Recently, several embedded wavelet coders have been proposed which use a global wavelet transform instead of block DCT. A wavelet transform is a type of transform which transfers image pixel values from the spatial domain to the frequency domain to perform the decorrelation. Wavelet transforms divide an original image into a plurality of frequency bands (subbands) using various types of filtering devices. Each of the subbands contains a different scale of wavelet coefficients, wherein the number of subbands created depends upon the desired scale to be reached. The first advantage of embedded wavelet coders is that they give a much better rate-distortion performance than JPEG and the blocking artifact is reduced significantly. The second advantage of embedded wavelet coders is their progressive coding property due to the use of successive approximation quantization (SAQ) and bit layer coding. SAQ is used to determine which quantization bits are significant and which are insignificant. Since there are correlations between insignificant bits, several methods have been developed to predict or to group these insignificant bits for effective lossless entropy coding.

During the quantization step in most of the proposed embedded wavelet coding schemes, a single initial quantization threshold is applied uniformly to wavelet coefficients of all subbands in the coding schemes to locate the significant bits. In most images, the maximum magnitude of the wavelet coefficients varies significantly from subband to subband. Coefficients in the lower frequency subbands tend to have a higher magnitude, while coefficients in higher frequency subbands have a smaller magnitude. With a single initial quantization threshold, it is common to generate a lot of zeros in the high frequency subbands during the first quantization steps. Thus, current quantization schemes generate too many insignificant bits in the first several quantization steps which unnecessarily adds to the computational complexity and coding time of the coding process.

There is clearly a need for a system and method for performing image compression using multi-threshold wavelet coding which improves the quality of a reconstructed image by eliminating the blocking artifact frequently occurring at low bit rates. Moreover, there is a need for a system and method for performing image compression using multi-threshold wavelet coding which reduces the computational complexity of the coder and improves the efficiency of the coder.

SUMMARY OF THE INVENTION

It is a primary object of the present invention to overcome the aforementioned shortcomings associated with the prior art.

The present invention provides a system and method for performing image compression using multi-threshold wavelet coding which avoids blocking artifacts from being produced in a reconstruction of the compressed image.

The present invention further provides a system and method for performing image compression using multi-threshold wavelet coding having a reduced computational complexity and an improved efficiency over previous image coders.

The system and method for performing image compression using multi-threshold wavelet coding of the present invention provides a better rate-distortion performance at high-bit rates while still reducing computational complexity.

The present invention provides a system and method for performing image compression using multi-threshold wavelet coding (MTWC) which utilizes a separate initial quantization threshold for each subband generated by the wavelet transform, which substantially reduces the number of insignificant bits generated during the initial quantization steps. Further, the MTWC system chooses the order in which the subbands are encoded according to a preferred rate-distortion tradeoff in order to enhance the image fidelity. Moreover, the MTWC system utilizes a novel quantization sequence order in order to optimize the amount of error energy reduction in significant and refinement maps generated during the quantization step. Thus, the MTWC system provides a better bit rate-distortion tradeoff and performs faster than existing state-of-the-art wavelet coders.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a system and method for compressing images using multi-threshold wavelet coding.

Embedded Wavelet Coders

Figure 1:
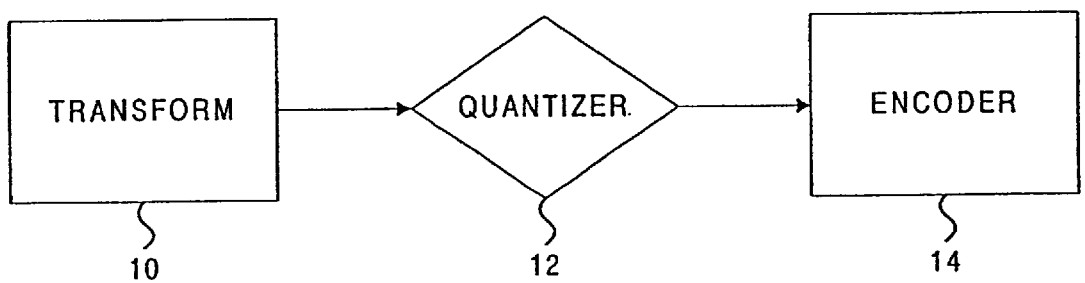
FIG. 1 is a schematic block diagram of a conventional transform image coder.
Figure 2:
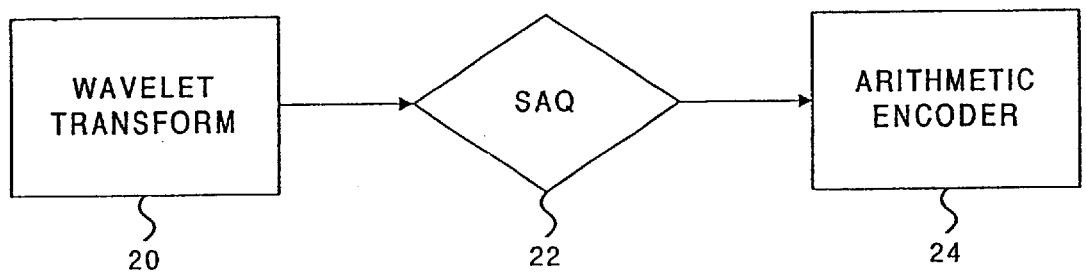
FIG. 2 is a schematic block diagram of a wavelet transform image coder.
Figure 3:
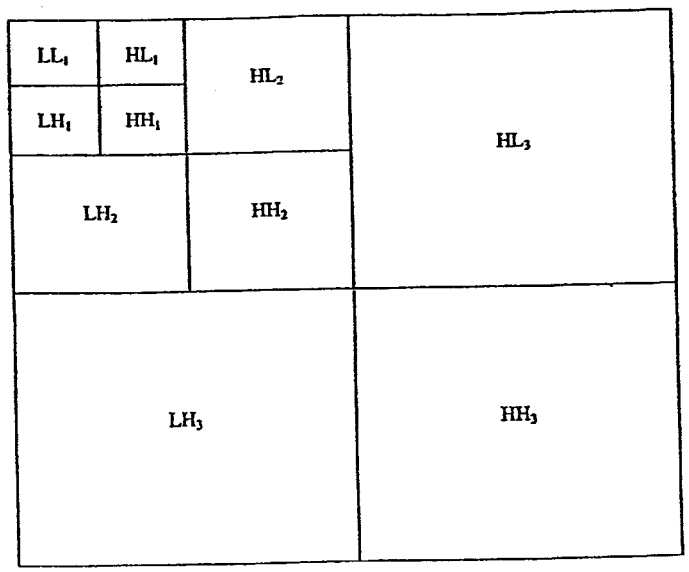
FIG. 3 is an illustration of the subbands of the wavelet transform coefficients generated by a wavelet transform of the pixel values of an image with each block representing a separate subband.

As previously described, most transform image coders include three stages: (1) the transform stage, (2) the quantization stage, and (3) the entropy coding stage. These three stages in modem embedded wavelet coders consist of (1) the wavelet transform 20, (2) successive approximation quantization (SAQ) device 22, and (3) entropy coder 24, as illustrated in FIG. 2. The wavelet transform 20 transfers image pixel values from the spatial domain into the frequency domain, where the image is divided into subbands which are spaced apart from one another in frequency. The coefficients from a particular subband are grouped together in blocks as shown in FIG. 3, where each of the blocks represents a separate subband. The different subbands arise from separate application of vertical and horizontal filters on the image data. The lower frequencies tend to be positioned in the upper left corner of each block while the values typically decrease moving in the direction toward the lower left corner of each block. The lower frequency values possess higher coefficient values than the higher frequency values.

Each block or subband may be further subsampled into additional subbands. For instance, the subband $LL_2$ in FIG. 3 is further decomposed and sampled to form subbands $LL_1$, $HL_1$, $LH_1$, and $HH_1$, where $LL_1$ represents the coarsest scale of the wavelet coefficients while $HH_3$ represents the finest. The goal of the transformation is to produce coefficients that are decorrelated.

Figure 4:
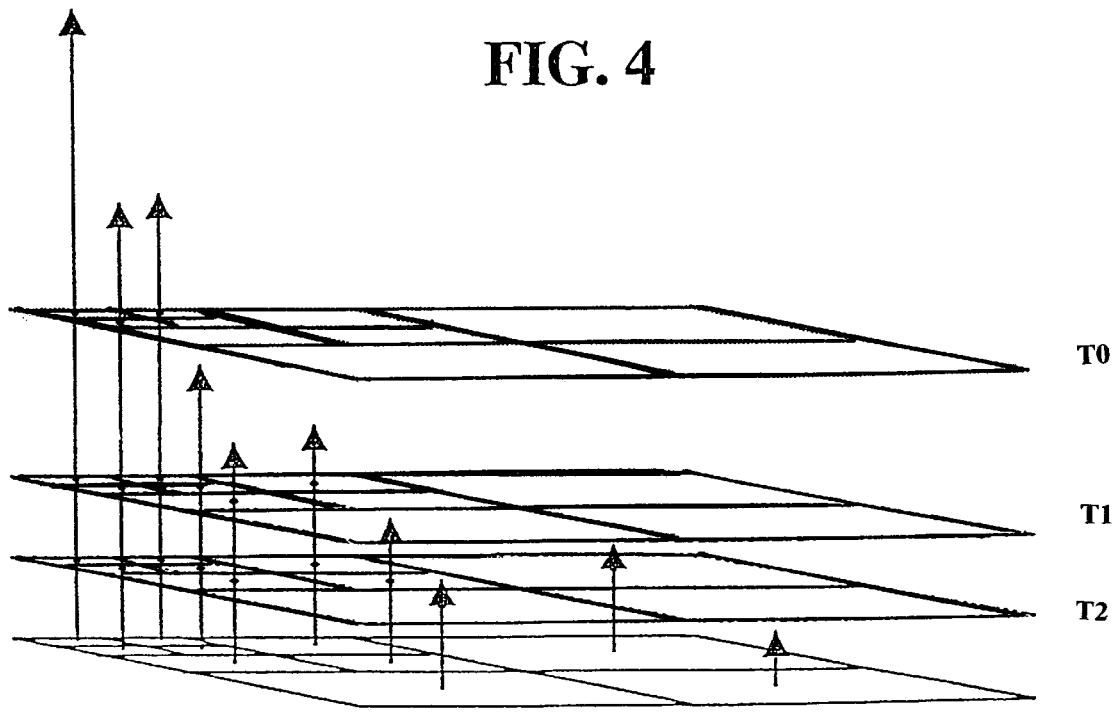
FIG. 4 is a perspective three-dimensional representation of the subband grouping illustration of FIG. 3 further showing the maximum coefficient values of the various subbands as well as the threshold values for various layers of the wavelet transform.

After the wavelet transform is complete, the coefficients are fed through a quantizer 22 where each coefficient value is mapped to a value within a fixed set of quantizer values. The following successive approximation quantization (SAQ) scheme is applied in modern embedded wavelet coders. Initially, the maximum absolute value $C_{max}$ is found for all of the wavelet coefficients $C(i,j)$ in all subbands, where the initial quantization threshold, $T(0)$, is set to be $T(0)=C_{max}/2+BIAS$, where BIAS is a very small constant. A significant map is then constructed identifying the significant bits, where the significant map is a binary decision as to whether a transform coefficient has a zero or nonzero quantized value. The wavelet coefficient has a non-zero quantized value if its wavelet coefficient value is equal to or greater than the threshold value $T(k)$ of the current layer k. Each layer k is a quantized bit plane with a different threshold value $T(k)$, as shown in FIG. 4. The arrows in FIG. 4 represent the maximum wavelet transform coefficient values in each of the subbands. If $C(i,j) \geq T(k)$, where $T(k)$ is the threshold of the current layer k, the SAQ adds pixel $(i,j)$ to the significant map and encodes it with '1S' where 'S' is the sign bit. Moreover, the wavelet coefficient is modified as follows:

$$C^{new}(i,j) = \begin{cases} C(i,j) - 1.5 \times T(k), \forall C(i,j) > 0 \\ C(i,j) + 1.5 \times T(k), \text{otherwise} \end{cases} \quad (1)$$

After construction of the significant map, a refinement map is then generated. For each wavelet coefficient C(i,j) considered to be significant in the significant map, the bit at layer k is encoded with a refinement bit which is a binary decision as to whether the modified wavelet coefficient is greater than or equal to another threshold value. For pixels which are also significant in the refinement map, the value of C(i,j) is further changed to:

$$C^{new}(i,j) = \begin{cases} C(i,j) - 0.25 \times T(k), \forall C(i,j) > 0 \\ C(i,j) + 0.25 \times T(k), \text{otherwise} \end{cases} \quad (2)$$

The SAQ is similar to bit-plane encoding in that all wavelet coefficients are quantized. The coefficient threshold T(k) is then halved for each additional layer k, so that:

T(k+1)=T(k)/2 for k=0, 1, 2, . . . , n, where n is the number of layers chosen for the desired coding. Thus, the quantization threshold is halved for each subsequent layer k. The refined threshold is then used with equations (1) and (2) to define significant and refinement maps for subsequent layers k. This iteration is repeated to produce n number of significant and refinement maps. Once a wavelet coefficient C(i,j) becomes significant in a layer k, the only process applied to the significant wavelet coefficient C(i,j) in further layers will be precision refinement by generating a refinement bit in the refinement map.

Multi-Threshold Wavelet Coder (MTWC)

Figure 5:
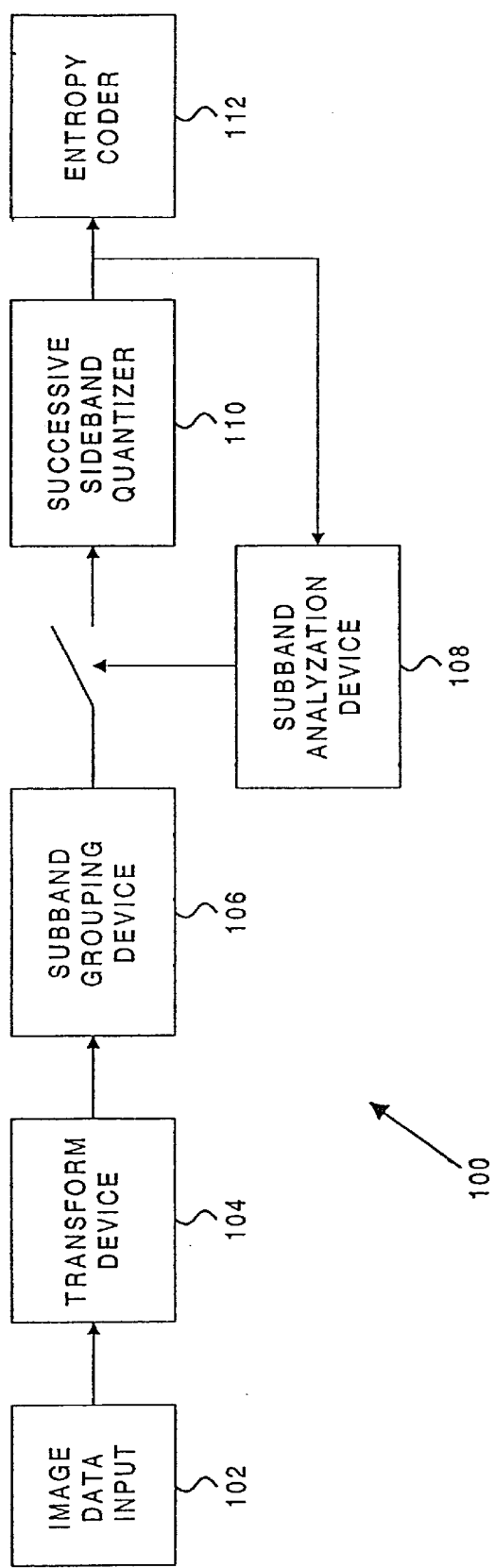
FIG. 5 is a block schematic diagram of a preferred embodiment of the Multi-Threshold Wavelet Coding System of the present invention.

Referring now to FIG. 5, the Multi-Threshold Wavelet Coder (MTWC) 100 of the present invention is illustrated in a block schematic diagram. The MTWC 100 includes an image data input device 102 for providing image data to the MTWC 100 for compression, wherein the input image data may comprise any type of image data. The input image data is fed through a transform device 104 which transfers the image pixel values from the spatial domain into the frequency domain. Transform device 104 is preferably a wavelet transform, but it is understood that the transform device 104 may comprise any type of spectral-spatial transform. Transform coefficients with the same spectral indices are then grouped together to form a subband using a subband grouping device 106 attached to the transform device 104.

The MTWC 100 further includes a subband analyzation device 108 which determines the order in which subbands are quantized and encoded. The subband analyzation device selects the desired subband which is then sent to the successive subband quantizer (SSQ) 110 where an improved quantization scheme is applied to the selected subband. The quantized wavelet coefficients are then sent to an entropy coder 112 for encoding.

Figure 6:
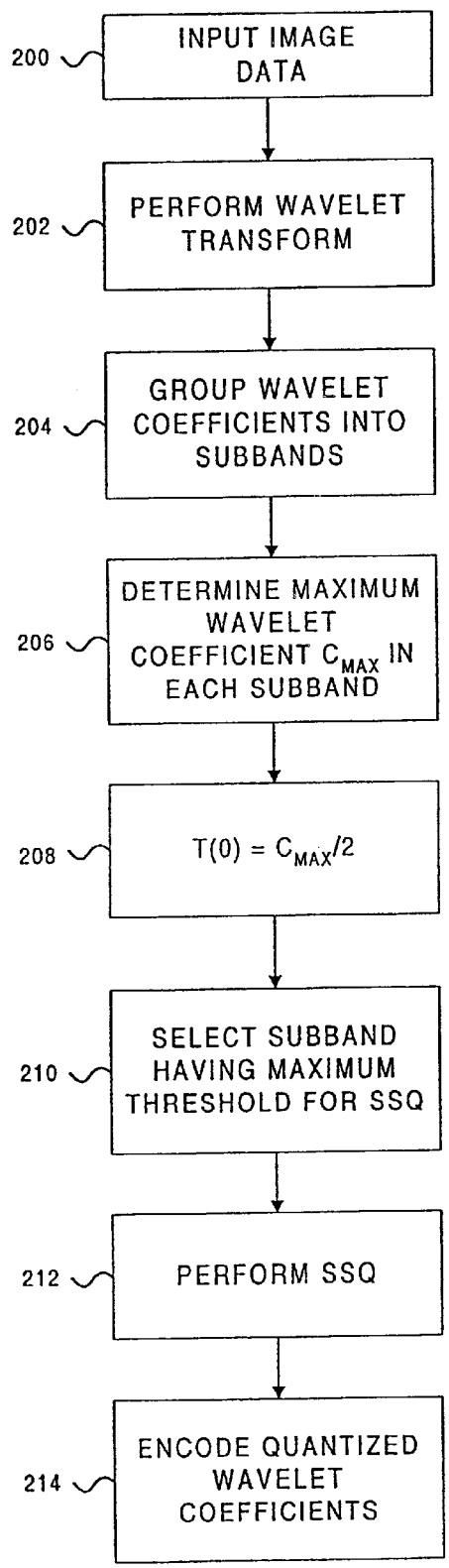
FIG. 6 is an operational block diagram of a preferred method of compressing images using Multi-Threshold Wavelet Coding in accordance with the present invention.

Referring now to FIG. 6, an operational block diagram of a preferred method of coding an image using the Multi-Threshold Wavelet Coder (MTWC) 100 of the present invention is illustrated. Initially in step 200, image pixel data for an image to be compressed is provided. The input image data may comprise any type of image data. For instance, the input image data may represent either still images or video images and either color images or gray-scale images. The input image data is then fed through the transform device 104 in step 202, where the image pixel values are transformed from the spatial domain into decorrelated wavelet coefficients in the frequency domain. In step 204, the wavelet coefficients with the same spectral indices are then grouped together to form a subband by the subband grouping device 106. For certain types of transforms, such as a discrete wavelet transform (DWT) or a wavelet packet transform (WP), the transform coefficients are already grouped into separate subbands by the transform itself so that no additional grouping of the coefficients is required. Thus, in a MTWC 100 employing a wavelet transform, the subband grouping device 106 can be eliminated from the MTWC 100 and step 204 is inherently performed by the wavelet transform of step 202. However, other transforms, such as a block DCT, will require the use of the subband grouping device 106 to group the transform coefficients into subbands. For instance, for 8-by-8 block DCT, all of the DC terms are grouped to form the DC subband, while the AC terms from different spatial blocks but with the same frequency indices are grouped to form an AC band. As a result, 64 subbands with the same size are obtained by the subband grouping device 106 for an 8×8 block DCT.

The subband analyzation device 108 then analyzes the magnitude of the coefficients within each subband in step 206. The maximum magnitude of the wavelet coefficients ($C_{max}$) within each subband is used to determine the initial quantization threshold T(0) for that particular subband i, where T(0) is set to equal $C_{max}/2$ for the particular subband i in step 208. The decision scheme implemented by the subband analyzation device 108 then selects the subband having the maximum initial threshold value as the current subband to be quantized in step 210. The MTWC 100 selects the initial threshold for each subband based upon the largest absolute value of all wavelet coefficients in that corresponding subband, where the initial quantization threshold T(0) is equal to one-half of the maximum wavelet coefficient value. The selected subband is then sent to the successive subband quantizer (SSQ) 110 where an improved quantization scheme is applied to the selected subband in step 212. Finally in step 214, the quantized wavelet coefficients are sent to an entropy coder 112 for encoding. The entropy coder 112 may comprise any efficient binary entropy coder. Instead of encoding all wavelet coefficients of all subbands at the same time, the MTWC 100 of the present invention locates the subband with the largest threshold value yet to be encoded and encodes the bit layer obtained via SAQ at that subband.

Rate-Distortion Tradeoff

During the quantization of the transform coefficients in step 212, each coefficient is mapped to a particular quantization value. Nearly all of the information loss during the encoding process occurs in the quantization stage. This loss takes into account the amount of distortion between the wavelet coefficient value and the quantized coefficient value as well as the bit rate. For a Gaussian distribution function with N(0, $\rho_i 2$), the distortion (D) to bit rate (R) function of each subband can be written as:

$$(D)(R) = \alpha_i \times 2 - \beta i(\gamma i)R$$

where $\alpha_i$ can be approximated by $\rho_i^2$ (the variance of subband i) and $\gamma_i$ is the shape parameter which depends on the image and $\rho_i^2$. Furthermore, it was observed empirically by an inventor of the present invention that $\beta_i \approx \beta$ for all i with $\beta=2+\epsilon$, where $\epsilon$ is the deviation parameter. $\epsilon$ is usually very small and can be either positive or negative depending upon the image and upon the actual coding efficiency of the chosen entropy coder. This empirical observation is described in an article "Image Compression Using Fast Rate-Distortion Optimized Wavelet Packet Transform," by C. C. Jay Kuo, Jin Li, and P. Y. Cheng, submitted to IEEE Trans. on Circuits and Systems for Video Technology, July 1996. The disclosure of this article is hereby incorporated by reference into the present application.

Empirical formula (3) will be explained theoretically using the JBIG as an entropy coder. The JBIG entropy coder is described in CCITT Draft Recommendation T.82 ISO/IEC Draft International Standard 11544 Coded Representation of Picture and Audio Information—Progressive Bi-Level Image Compression, WG90S1R5.1, April, 1992, wherein the disclosure of the JBIG entropy coder is hereby incorporated by reference into the present application. The coding inefficiency (CI) of the JBIG entropy coder is around 5% when the probability q of the least probability symbol (LPS) is in the range of $2^{-10}<q<2^{-1}$. This is usually achieved by choosing a proper context model. By incorporating these factors, the bit rate-distortion tradeoff can be rewritten as:

$$D(R) = \rho_i^2 \times 2^{-2} \times (1.0 - CI) \times 2^R = \rho_i^2 \times 2^{-1.926R} \quad (4)$$

where $\rho_i^2$ can be approximated by the mean square error (MSE) for the Gaussian pdf or the mean absolute error (MAE) for the Laplacian pdf.

Figure 7B:
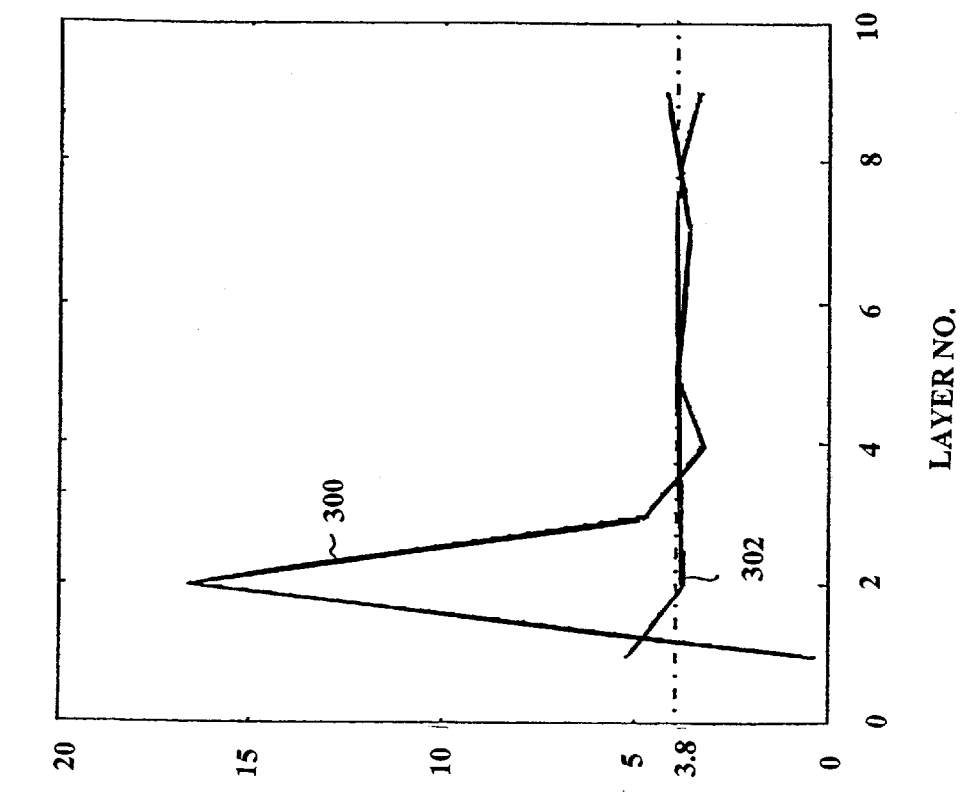
FIG. 7(B) is a graphical representation of the reduction ratio per output byte for the significant and refinement maps as a function of the threshold layers for the "Lena" test image.
Figure 7A:
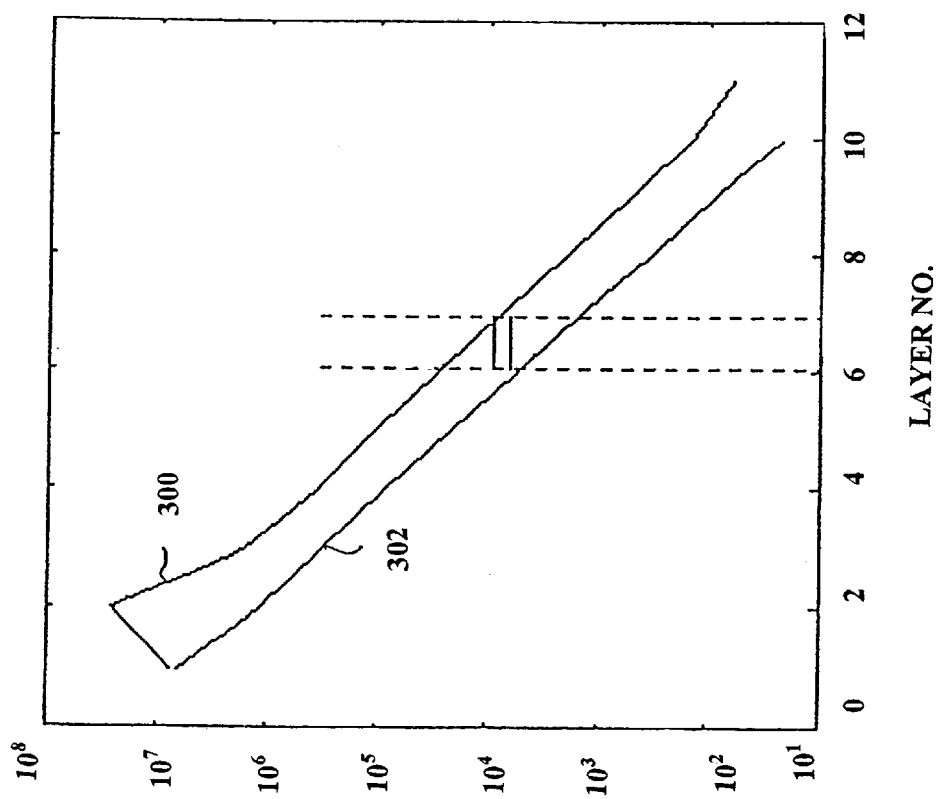
FIG. 7(A) is a graphical representation of the error energy reduction per output byte for the significant and refinement maps as a function of the threshold layers for the "Lena" test image.

Referring now to FIGS. 7(A) and 7(B), the distortion reduction per layer and the reduction ratio per output byte at each layer for the well-known "Lena" test image are illustrated, respectively. Line 300 represents the graphical representation of the significant map while line 302 represents the graphical representation of the refinement map. In accordance with the theoretical justification, the reduction ratio, which should be equal to $2^{-\beta i}$ is shown to equal $3.8=2^{-1.926}$. Several observations about the coding efficiency of SAQ are derived from the results of FIGS. 7(A) and 7(B). Initially, the logarithm of distortion energy is linearly decreased with the layer number per output byte for both significant and refinement maps. Secondly, the reduction ratio of distortion in both significant and refinement maps is a constant around 3.8. Further, the coding efficiency of the significant map is always better than that of the refinement map at the same layer. Finally, the coding efficiency of the significant map at the $k^{th}$ layer is better than that of the refinement map at the $(k-1)^{th}$ layer.

The distortion reduced per bit in the significant map is equal to $1.5T_k/2=0.75T_k$, where $T_k$ is the threshold of the $k^{th}$ layer. On the other hand, the distortion reduced per bit in the refinement map is equal to $0.25T_k$ which is less than $0.75T_k$. Moreover, the distortion reduced per bit in the $(k+1)^{th}$ significant map is equal to:

$$1.5T_{k+1}/2=0.75T_k/2=0.375T_k>0.25T_k.$$

During the quantization scheme performed by the MTWC 100, the wavelet coefficients are converted into a bit-stream where coefficient bits are classified to significant and refinement bits. Based on the foregoing analysis, the MTWC 100 was designed so that the transmission of the kth refinement map of subband i to the entropy coder 112 is followed immediately by the transmission of $(k+1)^{th}$ significant map of subband i to the entropy coder 112. After the bit layer coding, the threshold is halved and the above coding process is repeated.

The development of the MTWC 100 was motivated by the observation that prior SAQ schemes utilize a single initial threshold for all of the subbands, which results in too many insignificant bits being generated in the first several quantization steps. While other methods such as zero tree grouping have been developed to effectively encode these zeros (insignificant bits), the quantization and coding time of these other methods are actually wasted. The MTWC 100 of the present invention significantly reduces the computational complexity of the coding process by avoiding the processing of these insignificant bits, which is especially obvious at high compression ratio (or the low bit rate) cases.

Another motivation for developing the MTWC 100 is that, even though a generalized Gaussian pdf models the wavelet distribution of a single subband well, it is not as easy to find a single set of parameters, including the shape parameter $\gamma_i$ and the variance $\rho_i^2$, to model all subbands of an image simultaneously. By adopting separate multiple initial thresholds for different respective subbands, one generalized Gaussian pdf model can be implemented for each subband independently. Moreover, by analyzing the coefficients of the various subbands, it is possible to encode the most important subband at first and get the best result with only a small amount of information from the resource.

Subband Coding Order

Since each of the subbands will have different initial thresholds in the MTWC 100, the MTWC 100 must decide which subband to be coded in the next step. This is specified by a decision rule called the subband coding order sequence implemented by the subband analyzation device 108. The main ideas behind this decision rule are: 1) the subband with a better rate deduction capability is chosen earlier to improve the performance of the MTWC 100, and 2) the subband with a smaller number of coefficients is chosen earlier to reduce computational complexity, if the rate reduction performances of the two subbands are close.

Recall the rate-distortion approximated model, D(R):

$$D(R)=\rho_i^2 \times 2^{-1.926R}$$

where, $$\sigma_i^2 = \frac{1}{N} \sum_{t=1}^{N} [x(t)-m(i)]^2$$

and where m(i) is the mean and $\rho_i^2$ is the variance of subband i. In other words, the distortion is closely related to the variance $\rho_i^2$ of each subband. For a given bit rate R, we should encode the subbands with larger distortion D(R) first, since a larger distortion can be reduced by the coding bits. For natural images, the distribution function of wavelets in a subband can be well approximated by the Laplacian function and the variance can be estimated by using the minimum absoluted error (MAE) instead of the mean square error (MSE). In fact, the distortion can be expressed as a function of the variance:

$$D_{i,k}(R) = \begin{cases} T_{i,k}^2/12, \ \forall \ \sigma_i^2 > T_{i,k}^2/12 \\ \sigma_i^2, \text{ otherwise} \end{cases}$$

By utilizing the above result, the distortion reduction can be predicted for each subband in SAQ. For pixels which are significant in the current layer, the distortion reduction is close to $T_{i,k}^2/2$, where $T_{i,k}$ is the current threshold in selected subband i with step k. The subband coding order chooses the subband i whose current threshold $T_{i,k}$ is the largest.

The subband decision scheme of the MTWC 100 is image dependent. A "coding layer" is defined as leading by the DC term and also including those subbands chosen by subband decision scheme latter which are not the DC term. It is clear that the number of subbands in each coding layer may vary from one (DC term only) to all of the subbands. All of the subbands in each coding layer need not be coded in order reduce the computation complexity. Moreover, the subband sequence in each coding layer is different depending on the distortion in each subband, illustrating that the coding algorithm of the MTWC 100 highly depends on the particular image being coded and is adaptive in rate-distortion.

Subband Skipping

The scanning of all wavelet coefficients C(i,j) at all thresholds can be time-consuming. Thus, the MTWC 100 may utilize a subband skipping scheme to dramatically reduce quantization and coding time. In the wavelet transform, the combination of low pass filtering and high pass filtering is performed recursively. The low pass filtering has an amplification factor of $\sqrt{2}$. Thus, the magnitude of the wavelet coefficients decays from the coarsest LL subbands to the finer subbands. At the initial quantization threshold T(0), only a few subbands are significant and need to be inspected. As the quantization proceeds, the quantization threshold T(k) is halved after each pass, and more subbands may become significant under the newer, smaller threshold. The larger-sized subbands tend to become significant later than smaller-sized subbands.

Figure 8:
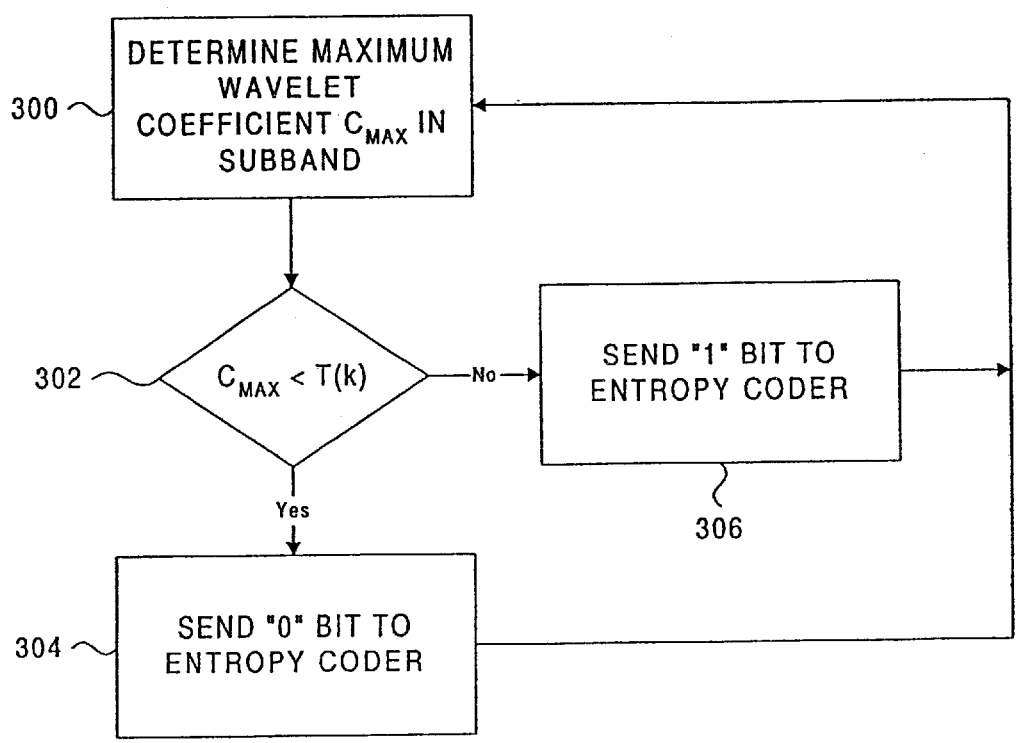
FIG. 8 is an operational block diagram of a method of skipping subbands during the quantization and coding procedures in accordance with an alternative embodiment of the Multi-Threshold Wavelet Coding system of the present invention.

The subband skipping method illustrated in FIG. 8 may be incorporated in the coding scheme of the MTWC 100 in order to flyer speed up the coding process. In prior coding schemes, if no wavelet coefficient C(i,j) in a subband was larger than the current threshold T(k), a whole layer of zeros would be generated for this subband by the quantizer. The time spent on processing all of these layers of zeros can be saved if a simpler bit-stream is generated which informs the decoder when each subband becomes significant.

Before the quantization is initiated, the maximum wavelet coefficient must be found to determine the initial threshold T(k) in step 300. The maximum wavelet coefficients in each subband are remembered, and during quantization, before a subband is scanned, the maximum wavelet coefficient in this subband is compared to the current threshold in step 302. If it is smaller than the current threshold, the entropy coder is notified in step 304 that this subband should be bypassed in decoding at this threshold. For instance, a "0" bit may be sent to the entropy coder to let the decoder know not to decode the subband at this threshold. The encoder then moves on to process the next subband. Otherwise, the decoder in informed instep 306 to decode this subband at the current threshold, such as by sending a "1" bit to the entropy coder. This necessitates only one "1" to be sent, and it is not necessary to store the maximum coefficients of the subbands in the compressed file.

Error Introduced by MTWC

Assume that $T_{max}$ is the initial threshold, i.e. the maximum coefficient magnitude in subband i, and $T_{max}/2^R \geq C(i,j) \geq T_{max}/2^{(R+1)}$ is the transformed coefficient of:

$$|C(i, j)| = a_0\left(\frac{T}{2^0}\right) + a_1\left(\frac{T}{2^1}\right) + a_2\left(\frac{T}{2^2}\right) + a_3\left(\frac{T}{2^3}\right) + \ldots = \sum_{k=0}^{\infty} a_k\left(\frac{T}{2^k}\right)$$

for pixel (i,j), where $T=T_{max}/2^{(R+1)}$ and $a_0, a_1, a_2, \ldots$ are binary values (either 0 or 1). The code stream for C(i,j) is $a_0$, s, $a_1, a_2, \ldots$, where s is the sign bit of C(i,j). Loss E(i,j) introduced by the proposed algorithm can be calculated by:

$$|R(i, j)| = 1.5a_0\left(\frac{T}{2^0}\right) + 0.5b_1\left(\frac{T}{2^1}\right) + 0.5b_2\left(\frac{T}{2^2}\right) + \ldots + 0.5b_M\left(\frac{T}{2^3}\right)$$

$$= 1.5a_0\left(\frac{T}{2^0}\right) + 0.5\sum_{k=1}^{\infty} b_k\left(\frac{T}{2^k}\right)$$

$$E(i, j) = \||C(i, j)| - |R(i, j)|\|$$

$$= \left|\sum_{k=0}^{\infty} a_k\left(\frac{T}{2^k}\right) - 0.5\sum_{k=0}^{M} b_k\left(\frac{T}{2^k}\right)\right|$$

$b_0 = 3a_0$ $$b_k = \begin{cases} +1, & a_k = 1 \\ -1, & a_k = 0 \end{cases} \quad \forall k = 1, 2, 3, \ldots, M$$

where R(i,j) is the reconstructed value based on received bit $a_0, a_1, a_2, \ldots, a_M$. According to the above analysis, losses E(i,j) in coding algorithm of the present invention are exponentially decaying while the incoming bit k increases linearly.

Unlike other coding schemes which are sequential coding in the subband and quantization steps, the MTWC 100 can perform parallel processing of the subbands. Each subband can have the quantization and entropy coding steps performed independently. If a subband chosen by the subband decision scheme is extremely complex for some reason, the quantization and entropy coding steps can still be simultaneously carried out on the other subbands in parallel to the subband having complex computations. Thus, most of the coding stream in each subband can be processed in advance before the subband decision scheme selects to send it out to be encoded, which significantly improves the compression speed.

Experimental Results

Figure 9:
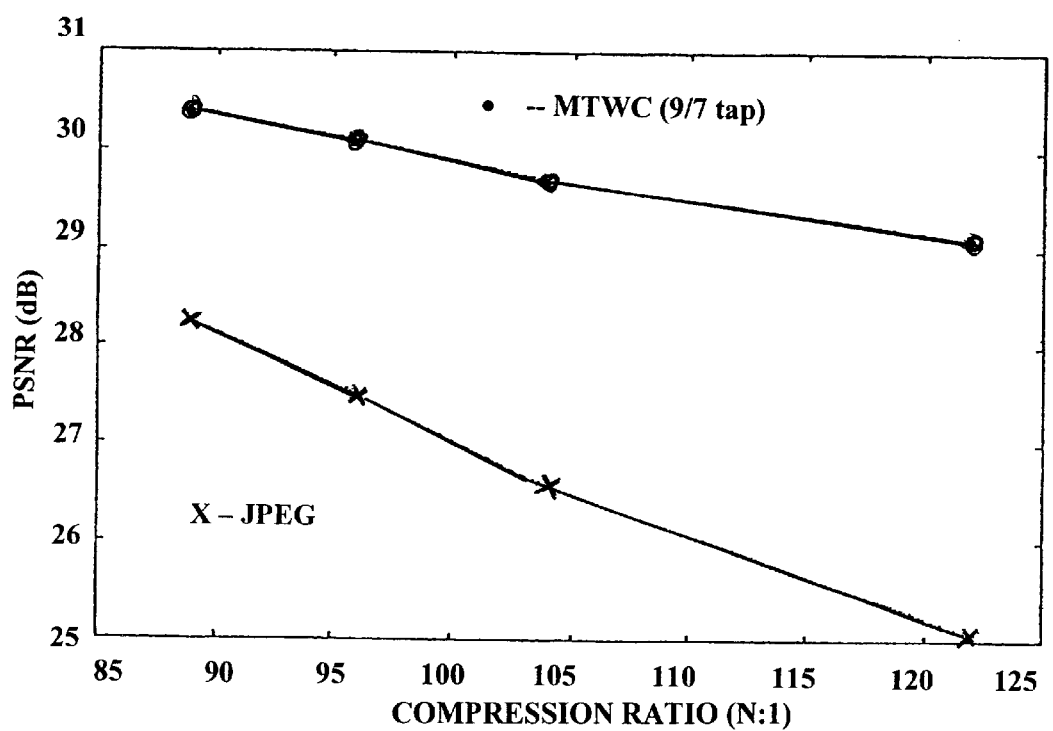
FIG. 9 is a graphical representation of PSNR as a function of the compression ratio for a comparison between color JPEG and the Multi-Threshold Wavelet Coding system of the present invention using a Daub. 16 wavelet filter.

The performance of the MTWC 100 in compressing a color image was performed on the "Kodak Color Pattern" to compare its performance with color JPEG. The comparison between color JPEG and the MTWC 100 using a Daub. 16 wavelet filter at low bits rates is illustrated in FIG. 9. As can be seen, the gain achieved by using the MTWC 100 is in the range of 2–4 dB for compression ratios between 90:1 to 125:1. This color image was further converted to a gray level image (i.e., Y component only) to compare the performance of the MTWC 100 with two other well-known embedded wavelet coders, the embedded zerotree wavelet (EZW) coder and the method of set partitioning in a hierarchical tree (SPIHT) coder. The results of this comparison are listed below in Table 1.

TABLE 1

| | PSNR Comparison of Lena Test Image | | | | |
|---|---|---|---|---|---|
| | 1.0 | 0.5 | 0.25 | 0.125 | 0.0625 |
| SPIHT | 40.40 | 37.21 | 34.11 | 31.09 | 28.36 |
| EZW | 39.61 | 36.43 | 33.55 | 30.70 | 28.36 |
| MTWC | 40.39 | 37.23 | 34.22 | 31.18 | 28.43 |

It can be seen that the MTWC 100 outperformed SPIHT about 0.15 to 0.61 dB and EZW about 0.18 to 1.71 dB for this test image. These experimental results are described merely for the purpose of illustration and do not encompass all possible types of encoder components which can be used in the MTWC 100 of the present invention.

As can be seen from the foregoing, a system and method for compressing an image using Multi-Threshold Wavelet Coding in accordance with the present invention has a reduced computational complexity and improved efficiency over prior image coders. Moreover, by forming a system and method for compressing an image using Multi-Threshold Wavelet Coding in accordance with the present invention, an image coder having a better rate-distortion tradeoff and which performs faster than existing state-of-the-art wavelet coders is provided. Furthermore, by forming a system and method for compressing an image using Multi-Threshold Wavelet Coding in accordance with the present invention, blocking artifacts which typically occur at low bit rates are avoided.

In each of the above embodiments, the structures of the system and method for compressing an image using Multi-Threshold Wavelet Coding of the present invention are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A system for coding an image using multi-threshold coding, comprising:

an image data source which provides image data to be compressed;

a transform device connected to receive the image data and transform the image data into decorrelated transform coefficients, where the transform coefficients are grouped into a plurality of subbands;

a subband analyzation device which determines the maximum value for the transform coefficients within each of the plurality of subbands, wherein initial threshold values for quantization are determined separately for each subband from the respective maximum transform coefficient values;

a quantizer arranged to receive and map the transform coefficients to a set of quantizer values derived from the initial threshold values; and an encoder arranged to encode the quantized values.

2. The system for coding an image of claim 1, wherein the subband analyzation device selects the subband having the greatest initial threshold value as the next subband to be sent to the quantizer.

3. The system for coding an image of claim 1, wherein the initial threshold values are determined separately for each subband to be equal to one-half of the maximum transform coefficient value within the respective subband.

4. The system for coding an image of claim 3, wherein the subbands are quantized in layers, wherein the threshold value of each layer is one-half of the threshold value of the previous layer.

5. The system for coding an image of claim 4, wherein the quantizer forms a significant map and a refinement map of significant bits for each layer, wherein each map is a string of bits representing whether the transform coefficients are at least equal a threshold value for a particular layer.

6. The system for coding an image of claim 5, wherein within each subband the significant map in a present layer is quantized immediately following the refinement map in a previously layer.

7. The system for coding an image of claim 4, wherein only those subbands having a maximum transform coefficient value greater than the threshold value of the current layer are quantized and encoded.

8. A method of coding an image using multi-threshold wavelet coding, comprising the steps of:

providing transform coefficients corresponding to respective pixels in an image to be coded;

grouping the transform coefficients into subbands;

obtaining the maximum transform coefficient value within each of the plurality of subbands;

determining initial threshold values for quantization separately for each subband from the respective maximum transform coefficient value of each subband;

quantizing the transform coefficients to a set of quantized transform coefficients derived from the maximum transform coefficient values within the respective subbands; and encoding the quantized transform coefficients.

9. The method of coding an image of claim 8, further comprising the step of selecting the subband having the greatest initial threshold value as the next subband to be quantized.

10. The method of coding an image of claim 9, wherein the initial threshold values are determined separately for each subband to be equal to one-half of the maximum transform coefficient value within the respective subband.

11. The method of coding an image of claim 10, wherein the subbands are quantized in layers with the threshold value of each layer being one-half the threshold value of the previous layer within the same subband.

12. The method of coding an image of claim 11, wherein only those subbands having a maximum transform coefficient value greater than the threshold value of the current layer are quantized and encoded.

13. The method of coding an image of claim 8, wherein the quantizing step includes the steps of:

forming a significant map of significant bits designating whether a transform coefficient is at least equal to a first threshold value;

modifying the values of transform coefficients which are determined to be significant bits; and forming a refinement map of significant bits designating whether a modified transform coefficient is at least equal to a second threshold value.

14. The method of coding an image of claim 13, wherein the significant map of a present layer of a subband is encoded immediately following the refinement map of a previous layer within the same subband.

* * * * *